Patented June 13, 1950

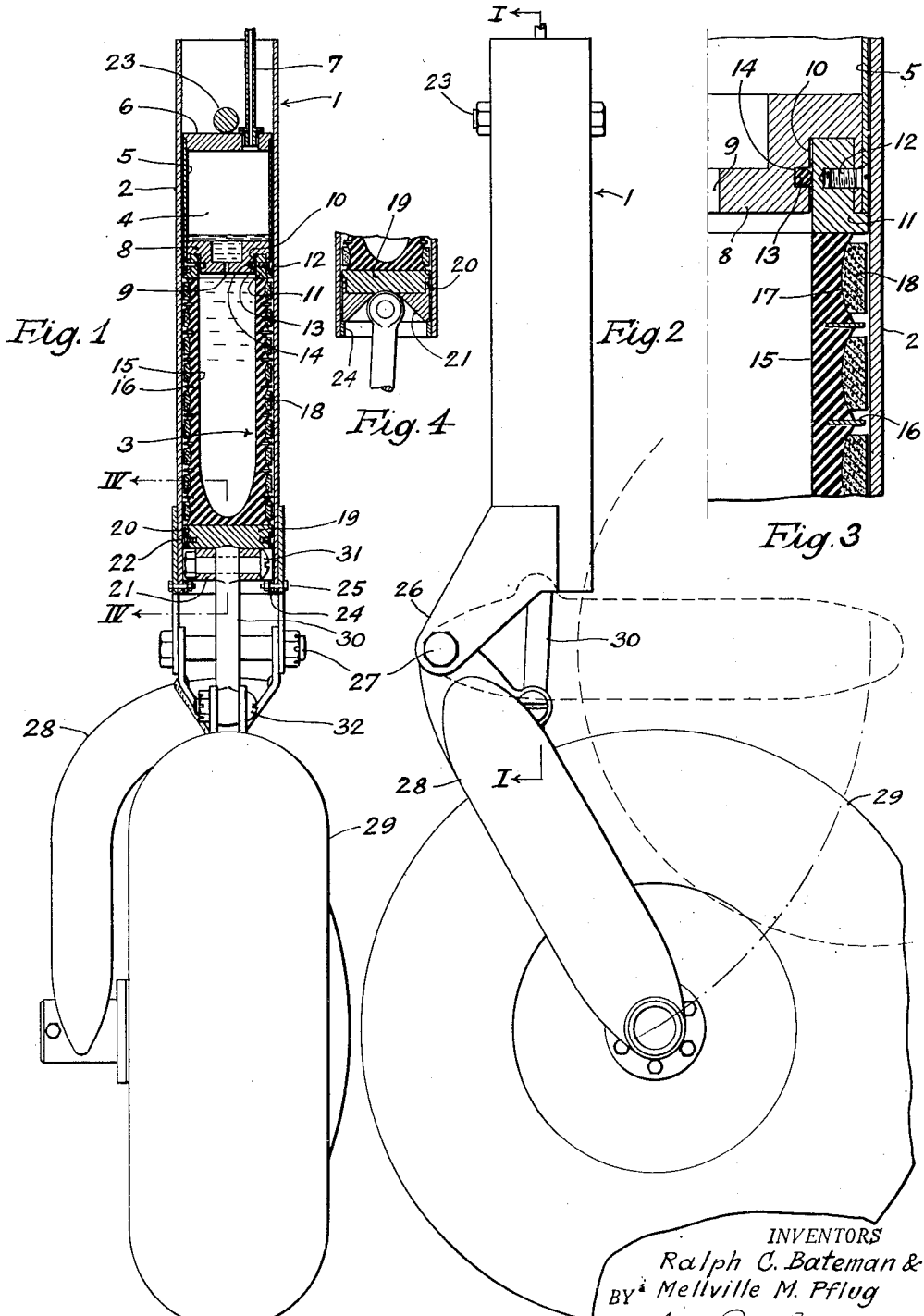

2,511,237

UNITED STATES PATENT OFFICE 2,511,237

SHOCK ABSORBING STRUT

Ralph C. Bateman, Elkton, Md., and Melville M. Pflug, Canton, Ohio, assignors to Goodyear Aircraft Corporation, Akron, Ohio, a corporation of Delaware Application June 26, 1948, Serial No. 35,316

9 Claims. (Cl. 267—64)

This invention relates to shock absorbers and in particular to the improvement of the piston construction of shock absorbing struts of the pneumatic hydraulic type as used in airplane landing gear.

For airplanes in the low price category it is essential to make the parts few in number, simple in construction and light in weight without impairing their efficiency and durability. Therefore, the construction of the invention was guided by such considerations.

Whereas constructions of resilient struts for absorbing shocks are known in the prior art in which the pneumatic and hydraulic pressure means are not subjected to leakages, such constructions often lack the necessary shock absorbing power to give adequate service in airplane landing gears without making them heavier than necessary.

It is the general object of the invention to avoid and overcome the foregoing and other difficulties of and objections to prior art practices by the provision of more adequate frictional shock damping means besides hydraulic resistance.

Another object of the invention is to provide an expandable hollow piston made of resilient rubber-like material, substantially covered over its full length by frictional material to reduce wear and tear and to provide the aforesaid damping action.

Another object of the invention is to provide a resilient hollow piston which is leakage-proof for the pneumatic-hydraulic pressure fluid contained therein.

The aforesaid objects of the invention, and other objects which will become apparent as the description proceeds, are achieved by a resilient longitudinally compressible piston surrounded by a plurality of loose piston rings, preferably made of cork, which are split to make them radially expandable against the cylinder wall when fluid pressure is applied to the rubber portion of the piston. The upper end of the resilient piston is fixed to an immovable rigid air chamber and its lower end, attached to a disc connected to a landing wheel arm, is movable so that in a landing the resilient piston is compressed axially to expand radially over its full length against the cylinder wall to frictionally resist its movement. In addition, a small orifice between the resilient piston body and the air chamber through which the piston fluid is pressed, acts as a brake to increase the dampening effect of the piston.

For a better understanding of the invention, reference should be had to the accompanying drawing, wherein Fig. 1 is a cross-sectional view of the strut taken on the line I—I of Fig. 2 of one embodiment of the invention;

Fig. 2 is a side view of Fig. 1;

Fig. 3 is an enlargement of a portion of the cross-sectional view shown in Fig. 1, and Fig. 4 is a cross-sectional view through the piston hinge, taken on line IV—IV of Fig. 1.

With specific reference to the form of the invention illustrated in the drawings the numeral 1 designates, in general, a landing gear strut which may be fixedly attached to an airplane (not shown). The strut 1 consists of a cylinder 2 and a piston indicated, in general, by the numeral 3. The upper end of the piston 3 is attached to a stationary air chamber 4 consisting of a cylindrical wall 5 loosely fitting into the cylinder 2 and being provided with an upper cover 6 having an air inlet 7, and with a lower cover 8 having a small orifice 9 for passing hydraulic fluid therethrough. Into the annular groove 10 in the bottom of cover 8 fits a ring 11 fastened by screws 12 thereto and which is sealed against the cover 8 by a packing ring 13 inserted in the groove 14 of this cover. To the bottom of ring 11 is cemented a resilient hollow piston body 15 open at the top and closed at the bottom and being radially spaced from the cylinder. This body containing hydraulic liquid, usually oil, has embedded therein and longitudinally spaced from each other a plurality of flat retaining rings 16, preferably made of sheet metal, which have a slight radial clearance in the cylinder. Between the rings 16 the resilient body 15 is provided on the outside with shallow annular grooves 17 into which are seated split piston rings 18 made of cork or other suitable friction material. The piston rings are given an easy slide fit in the cylinder. To the bottom of the resilient piston body 15 is securely cemented a metal disc 19 provided with an off-set 20 into which fits a hinge piece 21 fastened thereto by screws 22. This makes the piston 3 complete, which when inserted in the cylinder 2 rests with the top of the air chamber against the bolt 23 passing through the cylinder and is held against slipping out from the cylinder by a retaining ring 24 secured by screws 25 to the bottom of the cylinder. This construction makes it possible to exchange, if necessary, the resilient portion of the piston. However, instead of making the piston in three separate parts, the bottom hinge piece 21, as well as the bottom cover 8 of the air chamber, could be directly connected with the resilient piston body, thus, saving material and labor.

For making the strut operative, the piston is provided with a fulcrum 26 carrying the hinge bolt 27 about which the arm 28 with a landing wheel 29 rotatably mounted thereon is swingable. A link 30 swingably connected to the bolt 31 at the bottom of piston 3 and to bolt 32 on the arm 28 completes the structure.

Before operating the shock absorber the completely sealed piston is filled with fluid to somewhat above the bottom of the air chamber, then air pressure is applied, which will expand the resilient piston body and at the same time the piston rings which will exert pressure against the cylinder walls. At a landing shock the pressure will increase and uniform friction, due to the flexibility of the resilient piston body, is set up between the cylinder and piston rings for absorbing the shock. In addition, the landing shock is reacted against by the fluid in the piston while being pressed through the orifice into the compressed air chamber.

It will be recognized that the objects of the invention have been achieved by providing a most simple resilient strut construction having a minimum of parts combining great efficiency with safe and reliable functioning, and a minimum of wear due to large frictional surfaces subjected to uniform pressure.

While in accordance with the patent statutes one best known embodiment of the invention has been illustrated and described in detail, it is to be particularly understood that the invention is not limited thereto or thereby, but that the inventive scope is defined in the appended claims.

We claim:

1. In an airplane landing gear a pneumatic-hydraulic strut comprising a cylinder in fixed position, a resilient hollow piston to be filled with hydraulic fluid and open at one end in said cylinder, one end of the piston being movable and its other end being immovable in respect to said cylinder, a plurality of flat metal rings longitudinally spaced in said piston and extending therefrom, piston rings disposed in the spaces between said metal rings and being expandable with said piston, a pressure air chamber in fixed position relative to said cylinder, said chamber having an orifice in the bottom thereof, the chamber being secured to and sealed with the open end of said piston and communicating through said orifice with the inside thereof, a link pivotally attached to the closed end of said piston, and a pivotally mounted landing wheel arm pivotally connected to said link and adapted to move said piston upon movement of the wheel arm.

2. In an airplane landing gear a pneumatic-hydraulic strut comprising a fixed cylinder, a resilient hollow piston to be filled with hydraulic fluid and being open at one end disposed in said cylinder, a rigid compressed air chamber in fixed position in said cylinder and being air-sealed to and in communication with the inside of said piston, a plurality of flat metal rings inserted and longitudinally spaced in said resilient piston, piston rings between said metal rings being expandable with said piston when pressure is applied thereto, a hinge secured to the closed end of said piston, and a landing wheel support linked with said hinge and swingable about a fulcrum fixed to said cylinder.

3. A pneumatic-hydraulic strut comprising a fixed cylinder, a resilient hollow piston open at one end to be filled with hydraulic fluid, a rigid compressed air chamber in fixed position within said cylinder and being air-sealed with said piston at its open end and communicating therewith, said piston having a plurality of longitudinally spaced concentric metal rings securely embedded therein to extend beyond the outer wall surface thereof, piston rings being inserted between said metal rings and spaced therefrom and being expandable with said piston when pressure thereto is applied, and a hinge attached to the closed end of said piston and being adapted to be connected with a landing gear for operating said piston.

4. In a pneumatic-hydraulic strut a cylinder, a hollow resilient piston therein, said piston being open at one end and its outer wall being provided with a plurality of longitudinally spaced annular shallow grooves, a rigid compressed air chamber having an orifice being inserted in said cylinder in fixed position, said chamber being securely sealed against the open end of said piston and communicating by said orifice with the inside of said piston, flat sheet metal rings embedded in said piston at the ridges formed by said grooves and extending therefrom, expandable frictional piston rings fitting into said grooves to resist movement of the piston when axially compressed, and a hinge attached to the closed movable end of the piston adapted to be linked to a pressure mechanism for operating said strut.

5. In a pneumatic-hydraulic strut a cylinder, a hollow piston made of flexible resilient material to be filled with hydraulic fluid and having provided on its outer wall surface a plurality of longitudinally spaced annular shallow grooves, the piston being fixed with its open end in said cylinder against movement but movable therein with its closed end, flat metal rings embedded in said piston at the ridges formed by said grooves, and expandable piston rings fitting into said grooves and covering substantially the full length of said piston for providing frictional resistance in said cylinder when the piston is compressed.

6. In a pneumatic-hydraulic strut a cylinder, a hollow piston made of rubber-like material being open at one end and adapted to receive inside pressure, said piston being provided at its outer walls with a plurality of longitudinally spaced annular shallow grooves and being fixed at its open end against movement in said cylinder and movable therein with its closed end, flat metal rings embedded in said piston at the ridges formed by the grooves, and expandable piston rings inserted in said grooves for providing frictional resistance in said cylinder when the piston is compressed by inner and outer forces.

7. In a pneumatic-hydraulic strut a cylinder, a hollow rubber-like piston adapted for receiving pressure fluid, said piston having an open end fixed against movement in the cylinder and a closed end movable in the cylinder, the outer wall of said piston being provided with a plurality of longitudinally spaced annular shallow grooves, sheet metal rings being fixed and embedded in the ridges formed by said grooves, and expandable piston rings made of frictional material inserted in said grooves and extending over substantially the full length of said piston for providing frictional resistance in said cylinder when the piston is compressed.

8. In combination a cylinder, a hollow rubber-like piston movably received in the cylinder, means to establish pressure inside the piston to expand it toward the cylinder wall, a plurality of expandable rings of friction material removably carried by circumferential grooves in the outer surface of the piston and movable in frictional engagement with the cylinder wall upon expanding movement of the piston, and endless rings positioned between adjacent expandable rings to return the piston to its non-expanded dimensions.

9. In combination a cylinder, a hollow rubber-like piston movably received in the cylinder, means to establish pressure inside the piston to expand it toward the cylinder wall, a plurality of expandable rings of friction material carried by the outer surface of the piston and movable in frictional engagement with the cylinder wall upon expanding movement of the piston, and endless rings positioned between adjacent expandable rings to return the piston to its non-expanded dimensions.

RALPH C. BATEMAN.
MELVILLE M. PFLUG.

REFERENCES CITED

The following references are of record in the file of this patent:

UNITED STATES PATENTS

| Number | Name | Date |
|---|---|---|
| 638,374 | Aronstein | Dec. 5, 1899 |
| 1,169,625 | Dryer | Jan. 25, 1916 |
| 2,212,759 | Tea | Aug. 27, 1940 |